United States Patent
Werner

(10) Patent No.: US 6,724,422 B1
(45) Date of Patent: Apr. 20, 2004

(54) METHOD FOR AUTOMATICALLY SELECTING COLOR CALIBRATIONS

(75) Inventor: Winfried Werner, Kiel (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 09/646,052

(22) PCT Filed: Mar. 10, 1999

(86) PCT No.: PCT/DE99/00644
§ 371 (c)(1),
(2), (4) Date: Oct. 25, 2000

(87) PCT Pub. No.: WO99/46928
PCT Pub. Date: Sep. 16, 1999

(30) Foreign Application Priority Data

Mar. 12, 1998 (DE) .......................... 198 11 279

(51) Int. Cl.$^7$ .......................... H04N 17/00; H04N 17/02
(52) U.S. Cl. .......................... 348/187; 348/650
(58) Field of Search .......................... 348/222.1, 181, 348/187, 182, 188, 272, 649, 650, 652; 358/518, 520; 382/162, 167; 386/46

(56) References Cited

U.S. PATENT DOCUMENTS

| 4,642,684 A | 2/1987 | Alkofer |
| 5,172,224 A | 12/1992 | Collette et al. |
| 5,237,172 A | 8/1993 | Lehman et al. |
| 5,282,053 A | 1/1994 | Robideau |
| 5,805,213 A | 9/1998 | Spaulding et al. |
| 5,956,469 A * | 9/1999 | Liu et al. .............. 358/1.9 |
| 5,995,714 A * | 11/1999 | Hadley et al. .............. 358/1.9 |

FOREIGN PATENT DOCUMENTS

| DE | 43 09 877 | 10/1993 |
| DE | 42 26 218 | 11/1993 |
| DE | 42 39 315 | 1/1994 |
| DE | 43 09 879 | 4/1994 |
| DE | 44 33 529 | 3/1996 |
| DE | 195 39 717 | 11/1996 |
| DE | 43 05 693 | 12/1996 |
| DE | 195 39 736 | 5/1997 |
| WO | WO 96/08916 | 3/1996 |
| WO | WO 96/35291 | 11/1996 |

OTHER PUBLICATIONS

Automatische Farbkorrektur für Film, Video und Photo—S. Thust, et al—Fernseh–Und Kino–Technik51, No.Mar. 1997.

* cited by examiner

Primary Examiner—Chris Kelley
Assistant Examiner—Alicia M. Duggins
(74) Attorney, Agent, or Firm—Schiff Hardin LLP

(57) ABSTRACT

In a method for automatically selecting color calibrations for digital color image recording, especially for digital photography or digital video recording in any lighting conditions, at least one color calibration is produced and stored by recording a calibrated color table. The color calibration which best resembles the color cast of a color image is selected on the basis of the correlation between the color cast parameters of the color image which is being recorded and the respective color calibration. In the event that no matching color calibration is found by comparing the color cast parameters, a standard color calibration is selected.

11 Claims, 4 Drawing Sheets

| N color calibrations are produced |
|---|
| Photographing the calibrated color table |
| Color cast analysis for image light and image dark |
| Color cast compensation for image light and image dark |
| Calculation of the calibration fill |
| Deposit calibration fill + color cast parameters for image light and image dark in data file |

Fig. 2

METHOD FOR AUTOMATICALLY SELECTING COLOR CALIBRATIONS

BACKGROUND OF THE INVENTION

The invention is directed to a method for the automatic selection of color calibrations for digital color image acquisition and color image recording, particularly for digital photography or digital video recording under arbitrary lighting conditions.

In digital color image acquisition, it is necessary to undertake a post-processing and correction of the digital image data in the area of the signal processing. For that purpose, the device-dependent digital image data are transformed into a standardized, device-independent color system, for example into the CIELAB system. Such a transformation is undertaken on the basis of a color calibration. A color calibration for a device for color image acquisition is acquired in that a calibrated color table having a plurality of color fields whose CIELAB color values are known is registered with the device. The image data of the take for the individual color fields in the device-dependent RGB system (red, green, blue) are interpreted and allocated to the known CIELAB color values of these color fields. The color calibration derives from this allocation, i.e. which CIELAB color data belong to specific RGB color data that the device generates when taking a picture is now known. The transformation of the take data of an image with the color calibration acquired in this way simultaneously effects a color correction of the image.

The transformation of registered RGB image data into CIELAB color data on the basis of a selected color calibration can occur in an image processing station but can also occur directly in a device for taking pictures, for example in a digital camera. Two methods are currently employed.

In the first method, every lighting condition present at the acquisition location is calibrated, i.e. the calibrated color table is first photographed under the current lighting and a color calibration matching this lighting is acquired therefrom and stored. The pictures are subsequently taken and stored. The images are then either immediately transformed into CIELAB color data with the color calibration acquired immediately therebefore or later in a processing station. Very good results with respect to the color quality are achieved with this method. However, lighting conditions can change very fast, for example due to clouds or the like given exterior shots, so that the determination of a new color calibration is required. This method has the disadvantage of greatly limiting the photographer since he needs additional material (the calibrated color table), additional knowledge and additional exposure time.

In the second method, color calibrations are defined for a few, permanently set lighting conditions, usually only daylight and artificial light, and are automatically or manually selected with an image light analysis. However, the results that are thereby achieved are not adequate given high demands or unusual lighting. Thea advantage of this method is that the user can work freely without having to constantly register color tables.

This second method is described in greater detail below. There are several possibilities for realizing the method, whereby there are two correction modules that are employed in combination or individually. The correction modules are color calibration and color cast compensation. Even when the correction modules are combined, they work independently of one another according to the Prior Art, i.e. they are selected independently of one another and are then successively applied.

When an image has a color cast, then a color cast compensation is undertaken. A color cast is usually determined in that the histograms of the red, green and blue part of the color image data are investigated. FIG. 1 shows such histograms as an example. The densities of the color parts are entered on the horizontal axis, i.e. the logarithmized light intensity data. The frequencies of occurrence with which the densities occur in the image are entered on the vertical axis. Corner values for the darkest color values (image dark) and the brightest color values (image light) in the image are derived from the histograms. For example, the density at which the accumulated histogram has reached 5% is taken as image dark, and the density at which the accumulated histogram has reached 95% is taken as image light. The corner values acquired in this way are parameters that describe the color cast of an image. In the example of FIG. 1, the red part in the image light has a higher density than the green part and the blue part. The image thus has a red cast.

The color cast compensation is generally undertaken in that each primary color (RGB) is modified independently of one another by a linear function that is implemented on intensity-linear data, i.e. data that correspond to the sensor signals in the acquisition unit and are proportional to the intensity of the incident light. The colors are thereby provided with an offset and intensified such that the corner values given image light and/or image dark coincide after application of the function, i.e. image light and/or image dark subsequently lie on the gray axis. The linear functions for the color cast compensation can be realized as look-up tables that allocate modified color part data to the as yet unmodified color part data.

The color transformation on the basis of a color calibration can be implemented in addition to the color cast compensation or alone, i.e. without a preceding or following color cast compensation. The color transformation is a multi-dimensional allocation of color data, for example of CIELAB color data, to the RGB image data. Dependencies between the primary colors are thereby taken into consideration. The color calibration is generally designed as a multi-dimensional allocation table that is also referred to as a calibration fill. The color calibration, however, can also be defined by mathematical functions, for example by matrix multiplication. A color calibration can implicitly contain a color cast compensation that is worked into the multi-dimensional allocation table. No separate color cast compensation need be undertaken then. However, the color calibration can also be produced such that it assumes data free of color cast at the input and output of the transformation. In this case, a separate color cast compensation is implemented.

According to the Prior Art, the color calibration for digital image acquisition systems is based to a great extent on traditional photography. Daylight films are mainly employed in traditional photography. They are designed for a lighting corresponding to a color temperature of 5000–6000 K. This color temperature is delivered by all photoflash systems and under good daylight conditions. Artificial light films that are designed for approximately 3000 K and are used under halogen lighting are offered as the only widespread alternative to daylight films. Corresponding to the photographic standard, the digital image acquisition systems are calibrated for a color temperature of 5000–6000 K, i.e. the acquired image data are transformed with a color calibration matching this lighting. Slight deviations of the lighting are then potentially additionally compensated with a color cast compensation. Even despite the implementation of a color cast compensation, greater deviations lead

SUMMARY OF THE INVENTION

It is an object of the invention to acquire digital image data given arbitrary lighting conditions without burdening the user with the calibration operations needed due to a change in the lighting, whereby the further-processing of the images can automatically occur and a high color quality is achieved.

This object is achieved by a method for the automatic selection of color calibrations for digital color image acquisition, particularly for digital photography or digital video recording, under arbitrary lighting conditions, whereby a color image is to be corrected. Features of the invention are characterized in that at least one color calibration is generated in that an analysis of the color cast of the data of a take of a calibrated color table is implemented, a compensation of the color cast is undertaken and parameters for the color cast compensation are stored, at least one calibration fill is calculated with a calibration software from the color cast-compensated data of the take of the calibrated color table and is stored, and an entry about the analyzed color cast is respectively undertaken in the calibration fill or fills. A processing of the acquisition data of a current image occurs in that the color cast of the current image is analyzed and compared to the color casts of the stored color calibrations by means of a correlation and a selection from the stored color calibrations is implemented, whereby that color calibration whose stored color cast has the best approximation to the color cast of the current image is selected, and the selected color calibration is provided for generating a device-independent color transformation. When no color calibration having an adequately good correlation of the color cast stored with the color calibration is found in the comparison of the color cast of the current image to the color casts of the stored color calibrations, the user is informed thereof, so that the user can select a suitable color calibration, or a standard calibration is automatically selected from the stored color calibrations and provided for generating a device-independent color transformation of the image data of the current image.

The color cast of the current image is then compared to the color cast of the selected color calibration. The color cast parameters are selected for the transformation given good correlation, and the color cast parameters of the selected color calibration are selected for the transformation given poor correlation. Subsequently, the device-independent color transformation is implemented with the selected color cast parameters and with the selected color calibration.

The invention is described in greater detail below with reference to the example of a digital camera as a color acquisition device. The same principle, however, can also be applied to digital video recording. The new method functions given arbitrary types of light for the illumination, which can deviate greatly from the ideal black body. The previous, color-correct working range of a system (approximately 5000–6000 K) is expanded by arbitrary light types. The description of the invention also occurs with reference to FIGS. 1 through 5. Shown therein are:

BRIEF DESCRIPTION OF THE DRAWINGS

FIG. 2 is a flowchart for generating a color calibration;

DESCRIPTION OF THE PREFERRED EMBODIMENTS

According to the invention, a lighting illuminant is defined by a color calibration. The color calibrations are generated in that a calibrated color table is photographed under lighting with the respective illuminant, and the color calibration of the ICC specification is acquired from the data of the take. The exact description of the production of the color calibrations shall not be embarked upon here. The product description "ScanOpen" ICC Application of Heidelberger Druckmaschinen AG, D-34107 Kiel is referenced with respect thereto, this being obtainable under the identification number 05226870, version of May 1997. The publication "ICC Profile Format Specification", Version 3.4, Aug. 15, 1997, International Color Consortium (ICC, web site: http://www.color.org) is also referenced in this context. A calibrated color table has been standardized by both ANSI as well as ISO under the designation IT8. The color calibration images both the light conditions in the exposure as well as the color behavior of the sensor and of the signal processing in the acquisition device.

The color calibrations are produced for various ruminants, for example artificial light/tungsten (approximately 3000 K)

standard light (approximately 5000 K)

sunlight (approximately 6000 K)

shadow (approximately 8000 K).

During the production of the calibration, the color cast is analyzed for each exposure of the calibrated color table, and the corresponding color cast parameters for image light and image dark are identified. The color cast is essentially produced by the color spectrum of the light of the exposure. A compensation of the color cast is then undertaken, and a calibration fill is calculated with a calibration software using the color cast-compensated data of the take of the calibrated color table and is stored. The identified color cast parameters are stored together with the calibration fill. FIG. 2 shows these steps again as a structure diagram according to Nassi Schneidermann. The production of such color calibrations can be repeated or expanded arbitrarily often. The production can be implemented both by the manufacturer as well as by the user.

Figure 1:
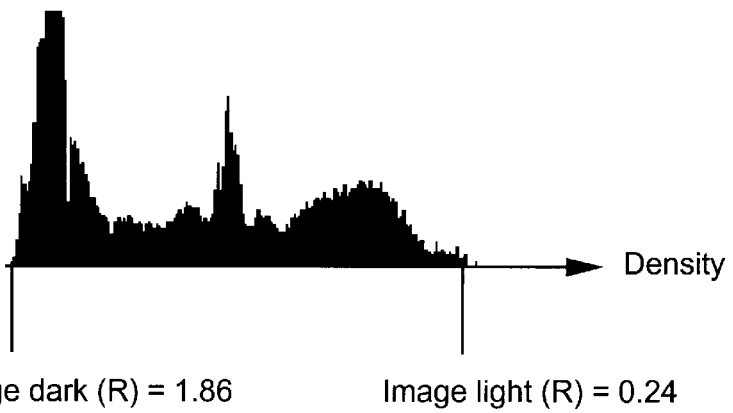
FIG. 1 shows histograms for the color components red, green and blue of an acquired image.
Figure 1:
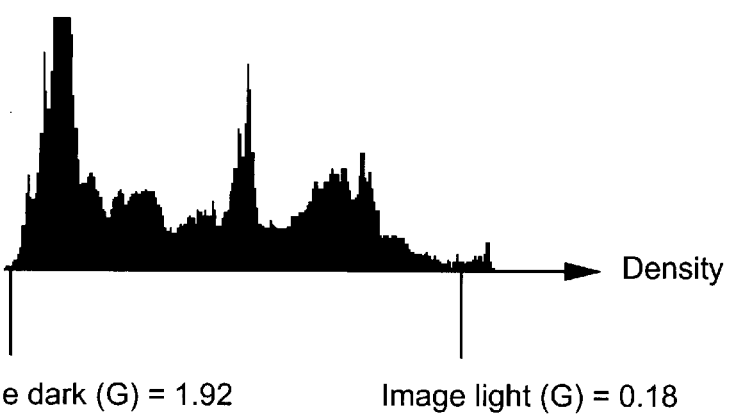
Figure 1:
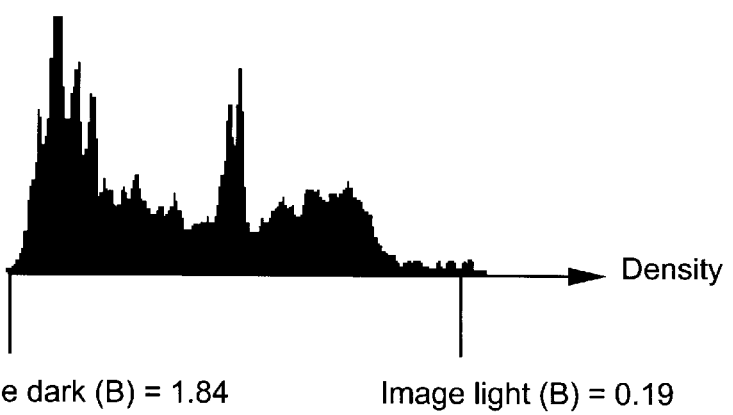
Figure 3:
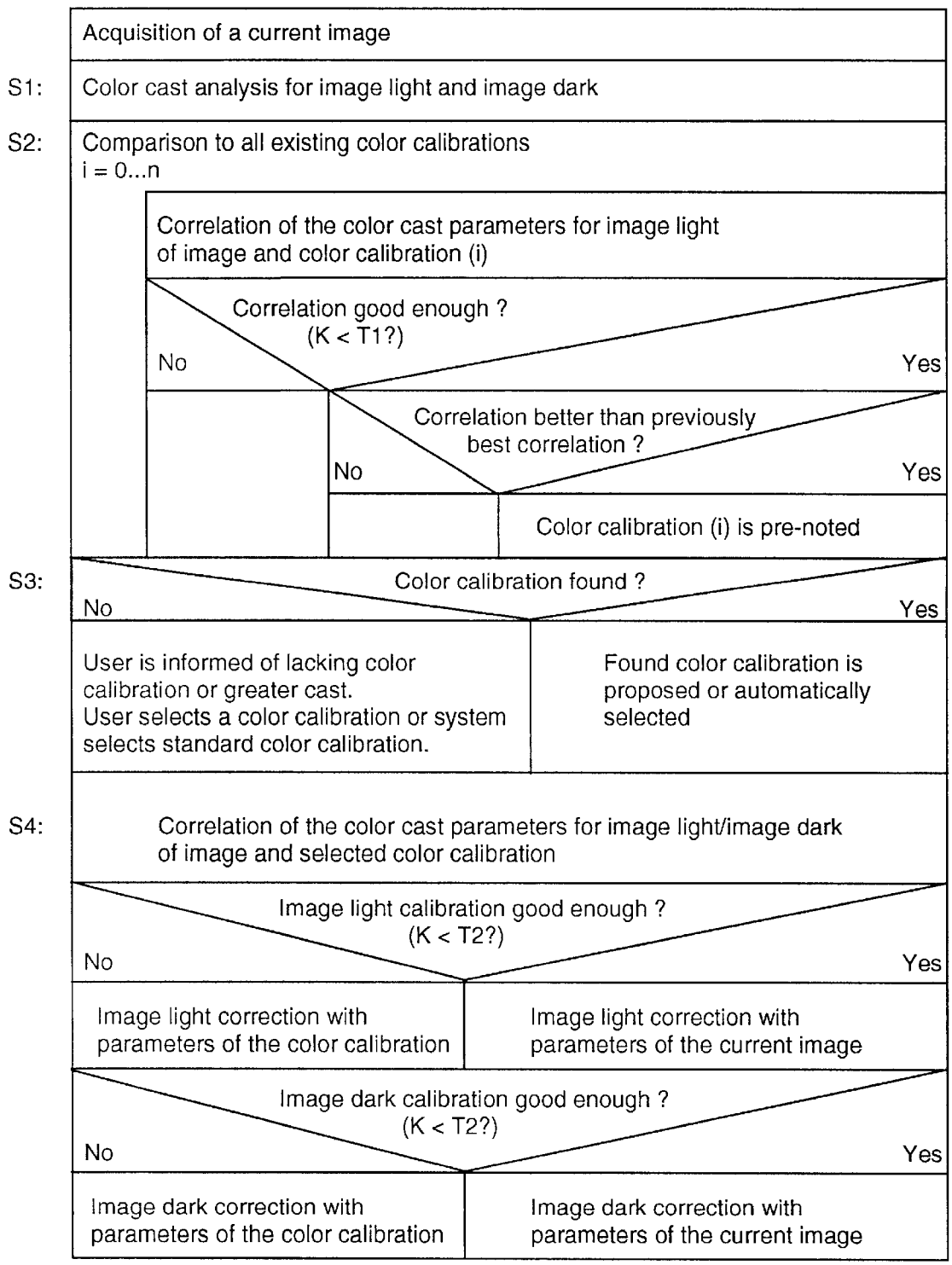
FIG. 3 is a flowchart for selecting a color calibration.

The inventive method for the selection of a suitable color calibration for a currently acquired image is described below. The method steps are summarized in FIG. 3 in a structure diagram.

In step S1, a color cast analysis of the current image is implemented for image light and image dark, for example by evaluating the histograms for the red, green and blue color components. Alternatively, color cast information offered by the camera electronics of color cast information that are acquired from picture elements that the user specifically selects for this purpose can be employed.

Figure 4:
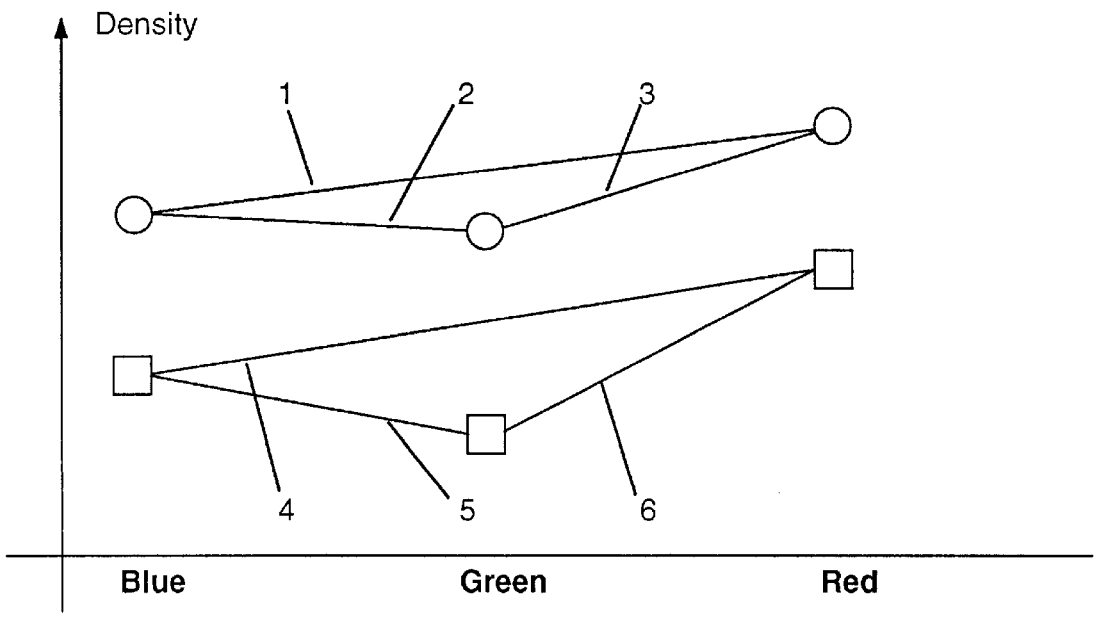
FIG. 4 shows an example of a good correlation.
Figure 5:
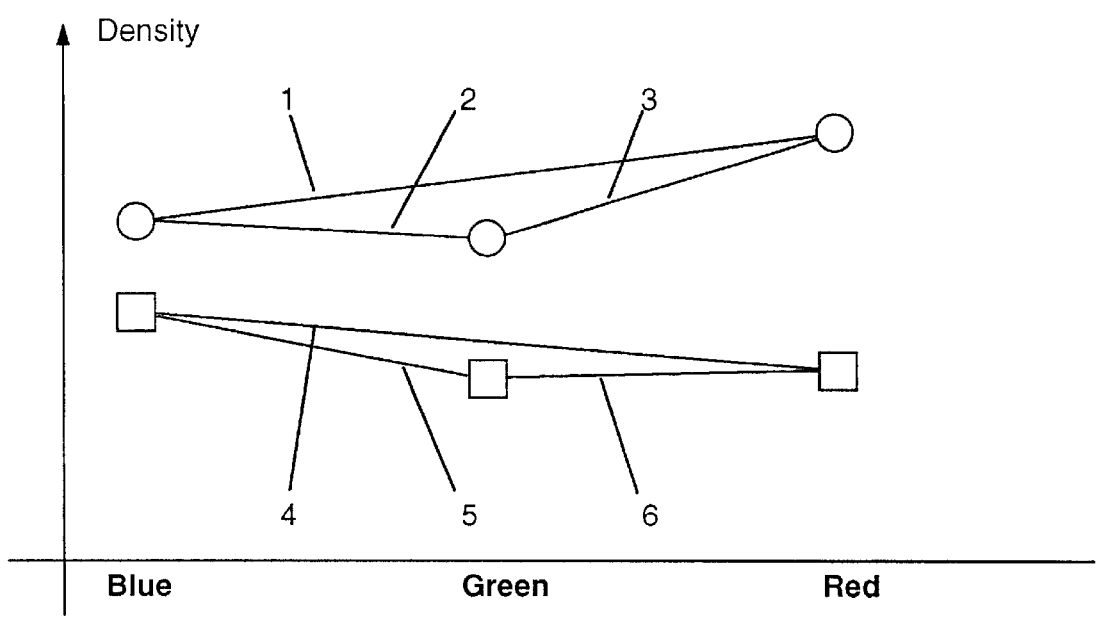
FIG. 5 is an example of a poorer correlation.

In step S2, a search is made for the color calibration that fits best with respect to the color cast compensation. For that purpose, the stored color cast parameters of all existing color calibrations are compared to the color cast parameters of the current image on the basis of a correlation function. FIG. 4 shows an example for the formation of the correlation function. The color cast corner values for image light of the current image and the corresponding corner values of the color calibration being investigated at the moment are entered in a diagram and respectively connected to one another by the straight lines (1) through (6). The slopes of the straight lines are then determined. They are referenced A1 through A6 here. The function $$K = abs(A1-A4) + abs(A2-A5) + abs(A3-A6)$$

is then formed as correlation value K, i.e. the sum of the absolute slope differences of the straight lines (1) and (4), (2) and (5) as well as (3) and (6) that correspond to one another. A good correlation is established when the correlation value is as small as possible. The correlation value is then compared to a first threshold T1 in order to decide whether the correlation is good enough. When this is not the case, the next existing color calibration is investigated. When the correlation is good enough, the correlation value is compared to that of the best color calibration hitherto found. When the correlation of the currently investigated color calibration is better, it is noted for the later selection.

In step S3, a determination is first made as to whether a suitable color calibration was found in step S2. When this is not the case, the user is informed thereof, so that the user can select a suitable color calibration on the basis of his experience, or the system selects a standard color calibration provided for this case. When a suitable color calibration was found in step S2, this is presented to the user for selection or it is automatically selected right away.

In step S4, the color cast parameters of the current image and the previously selected color calibration are again compared separately for image light and image dark in order to decide which color cast parameters are used for the color cast compensation of the current image. For that purpose, the correlation value K for image light is first compared to a second threshold T2. When the correlation is good enough, the color cast of the current image in the image light area is corrected with the color cast parameters of the current image. Otherwise, the correction is implemented with the color cast parameters of the selected color calibration. Subsequently, the same comparison and the correction of the color cast with the better-suited parameters is implemented for the image dark area.

Finally, the selected color calibration is applied to the color cast-corrected image data of the current image in order to transform them into a device-independent color system. A color-correct presentation of the image is thus achieved.

The inventive method can be expanded and improved in that additional take parameters are also utilized for the comparison in addition to the comparison of the color cast parameters for selecting the best-suited color calibration. For example, information such as diaphragm, exposure time, whether the shot was made with flash and with which flash settings can be stored together with the generated color calibration in the photograph of the calibrated color table and can be compared later to the corresponding information of the current image acquisition. In addition, the time of day of the photograph (morning, during the day, evening, night) can be retained as further information that says something about the light conditions when the picture was taken. For example, all parameters can then be operated according to the principles of fuzzy logic in order to arrive at an even more reliable decision about the selection of the correct color calibration.

Although various minor changes and modifications might be proposed by those skilled in the art, it will be understood that my wish is to include within the claims of the patent warranted hereon all such changes and modifications as reasonably come within my contribution to the art.

I claim:

1. A method for automatic selection of color calibrations for digital color image acquisition under arbitrary lighting conditions and for correction of take data of a color image with the color calibrations based on a color cast compensation and a color transformation, whereby it is not only neutral colors that are utilized for the color cast compensation, comprising the steps of:

produce at least one color calibration by acquiring a calibrated color table under defined lighting conditions;

implementing an analysis of the color cast of the take data of the color table and determining parameters that describe the color cast of the take data of the color table;

undertaking a compensation of the color cast of the take data of the color table;

calculating at least one color calibration from the color cast-corrected take data of the color table and storing it;

storing the determined parameters of the color cast of the take data of the color table together with the color calibration;

determining color cast parameters of the take data of the color image and comparing them to the stored color cast parameters of the color calibrations; and undertaking a selection of a color calibration on the basis of the comparison.

2. The method according to claim 1 wherein the comparison of the color cast parameters is implemented with a correlation.

3. The method according to claim 1 wherein the color calibration whose stored color cast parameters are correlated best with the color cast parameters of the color image is selected.

4. The method according to claim 1 wherein a standard color calibration is selected when an adequately good correlation of the color cast parameters is not found in the comparison of the color cast parameters of the color calibrations and of the color image.

5. The method according to claim 1 wherein the user is informed when an adequately good correlation of the color cast parameters is not found in the comparison of the color cast parameters of the color calibrations and of the color image, so that the user himself can select a suitable color calibration.

6. The method according to claim 1 wherein the color cast parameters of the color image are compared to the color cast parameters of the selected color calibration, and the color cast parameters of the color image are employed for the color cast compensation of the color image given good correlation and the color cast parameters of the selected color calibration are employed for the color cast compensation of the color image given a poor correlation.

7. The method according to claim 1 wherein the comparison and the selection of the color cast parameters employed for the color cast compensation is undertaken separately for the image light area and for the image dark area of the color image.

8. The method according to claim 1 wherein a color transformation of the take data of the color image is implemented with the selected color calibration.

9. The method according to claim 1 wherein at least one additional photographic parameter selected from the group diaphragm, exposure time, distance, flash settings, and time of day of the exposure is involved in the comparison of the color calibrations to the color image.

10. The method of claim 1 wherein the method is employed for at least one of digital photography and digital video recording.

11. A method for the automatic selection of color calibrations for digital color image acquisition under arbitrary lighting conditions, and for correction of take data of a color image with the color calibrations on the basis of a color cast compensation, comprising the steps of:

producing at least one color calibration by acquiring a calibrated color table under defined lighting conditions;

implementing an analysis of the color cast of the take data of the color table and determining parameters that describe the color cast of the take data of the color table;

undertaking a compensation of the color cast of the take data of the color table;

calculating at least one color calibration from the color cast-corrected take data of the color table and storing it;

storing the determined parameters of the color cast of the take data of the color table together with the color calibration;

determining color cast parameters of the take data of the color image and comparing them to the stored color cast parameters of the color calibrations; and undertaking a selection of a color calibration on the basis of the comparison.

* * * * *